United States Patent
Bausch et al.

(10) Patent No.: US 6,449,575 B2
(45) Date of Patent: Sep. 10, 2002

(54) VOLTAGE CONTROL OF INTEGRATED CIRCUITS

(75) Inventors: James F. Bausch, Salem; Andrew L. Van Brocklin, Corvallis; Chadwick W. Stryker, Albany, all of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/905,595

(22) Filed: Jul. 13, 2001

Related U.S. Application Data

(62) Division of application No. 09/296,703, filed on Apr. 21, 1999.

(51) Int. Cl.[7] ..................... G01D 3/00; G01M 19/00
(52) U.S. Cl. ........................... 702/107; 327/513
(58) Field of Search .......................... 702/107, 108, 702/116, 117, 130; 713/320, 321, 322; 327/512, 513

(56) References Cited

U.S. PATENT DOCUMENTS

| | | | | |
|---|---|---|---|---|
| 5,021,679 A | * | 6/1991 | Fairbanks | 307/66 |
| 5,258,662 A | * | 11/1993 | Skovmand | 327/544 |
| 5,440,520 A | * | 8/1995 | Schutz et al. | 365/226 |
| 5,691,870 A | * | 11/1997 | Gebara | 361/86 |
| 5,760,636 A | * | 6/1998 | Noble et al. | 327/513 |
| 5,875,085 A | * | 2/1999 | Farley | 361/18 |
| 6,094,104 A | * | 7/2000 | Morgan | 331/57 |

\* cited by examiner

Primary Examiner—John S. Hilten
Assistant Examiner—Demetrius R. Pretlow
(74) Attorney, Agent, or Firm—Timothy F. Myers

(57) ABSTRACT

A method and apparatus for operating an integrated circuit in an electronic device by controlling the supply voltage to the integrated circuit (IC). A parameter of the IC is measured and used to adjust the supply voltage of the IC. The measured parameter is indicative of the effective channel mobility of the IC. One purpose of adjusting the voltage is to modify the effective channel mobility such that the individual channel currents are substantially constant over a predetermined operating temperature range of the IC. The modification of channel mobility is chosen to set the individual channel currents at levels that either maximizes operating speed, minimizes power consumption, extends the range of operating temperature, or increases the operational reliability of the IC.

2 Claims, 7 Drawing Sheets

CONFIGURATION: Select Operating Mode

☞ MAXIMIZE PERFORMANCE

☞ MAXIMIZE BATTERY LIFE

☞ EXTEND TEMPERATURE OPERATION

☞ USE DEFAULT OPERATION

Fig. 7

VOLTAGE CONTROL OF INTEGRATED CIRCUITS

This application is a division of application Ser. No. 09/296,703, filed Apr. 21, 1999.

FIELD OF THE INVENTION

This invention relates to a voltage control system for an integrated circuit (IC). More particularly, it relates to a voltage control system that selects the voltage of the IC based on the detection of the effective channel mobility of the IC.

BACKGROUND OF THE INVENTION

The personal computer has continued its trend of delivering better performance at a lower cost. However, in order to continue delivering these features, new methods of designing computers need to be developed. When the processors inside computers are operating at high clock speeds, the power consumed by the processors increases dramatically. This increased power is dissipated in the computer as excess heat. When the excess heat is not properly controlled or removed from the computer, the user of the computer may experience erratic behavior, system failure, or extremely hot surfaces which may burn, possibly causing injury.

This increase in power is especially a concern in the design of other portable electronic devices such as handheld personal data assistants, calculators, and notebook computers, to name a few. This concern is due not only to the increased chance of physical contact with hot areas on the device but also due to the fact that increasing the power reduces the battery operating time of the device. Users of notebook computers, in particular, do not want to sacrifice performance for longer battery life. They insist on both. Indeed, for a marketable product, a notebook computer should deliver substantial parity with desktop computer performance and provide adequate battery life, preferably greater than two hours.

New models of processors for notebook computers, however, will be consuming more power themselves than the power consumed by an entire notebook computer of previous generations. One proposal to address this increased power is to allow desktop performance when a notebook computer is attached to a "docking station" which has additional heat dissipation capabilities such as larger fans or heat sinks. When the notebook computer is removed from the docking station, the processor in the notebook is operated at a lower speed to reduce power, notwithstanding, this also reduces performance. Previous market data has shown that users do not wish to lose their performance while operating their notebook remotely. The proponents of this proposal assert that with the increased performance capability of the processor, even reducing the performance by 50%, there is adequate performance at this slower speed for most tasks. However, this assertion is true even with current generation notebook computers and users simply have chosen not to operate their notebook computers in this fashion. Since the trend in computers is for ever higher clock speeds in processors, this problem of meeting both performance and providing adequate battery life is just going to get worse.

Additionally, in order to keep the cost of portable electronic devices acceptably low in to the consumer marketplace, manufacturers of the devices have typically designed them to operate at substantially indoor environmental conditions. The aforementioned need to meet increased performance goals has also required the manufactures to tighten the design specification tolerances, such as temperature, to insure reliable operation. Many users, however, are needing to use their electronic devices, such as notebook computers, remotely in environments which may exceed the design specifications of the device. Such examples are data collection tasks in hot, dry deserts, rainforests, and also frigid ice and snow covered mountains. One solution is to provide a special case in which to enclose the product in order to maintain an adequate operating environment. This solution, however, increases the cost and restricts the operational convenience.

SUMMARY

A method and apparatus for efficiently operating an integrated circuit in an electronic device by controlling the supply voltage to the integrated circuit (IC). A parameter of the IC is measured and used to adjust the supply voltage of the IC. The measured parameter is indicative of the effective channel mobility of the IC. One purpose of adjusting the voltage is to modify the effective channel mobility such that the individual channel currents are substantially constant over a predetermined operating temperature range of the IC. The modification of channel mobility is chosen to set the individual channel currents at levels that substantially either maximizes operating speed, minimizes power consumption, extends the range of operating temperature, or increases the operational reliability of the IC.

BRIEF DESCRIPTION OF THE DRAWINGS

FIG. 7 illustrates an exemplary screen interface which allows a user of an electronic device to select a desired operating mode.

DETAILED DESCRIPTION OF THE PREFERRED AND ALTERNATE EMBODIMENTS

Figure 1:
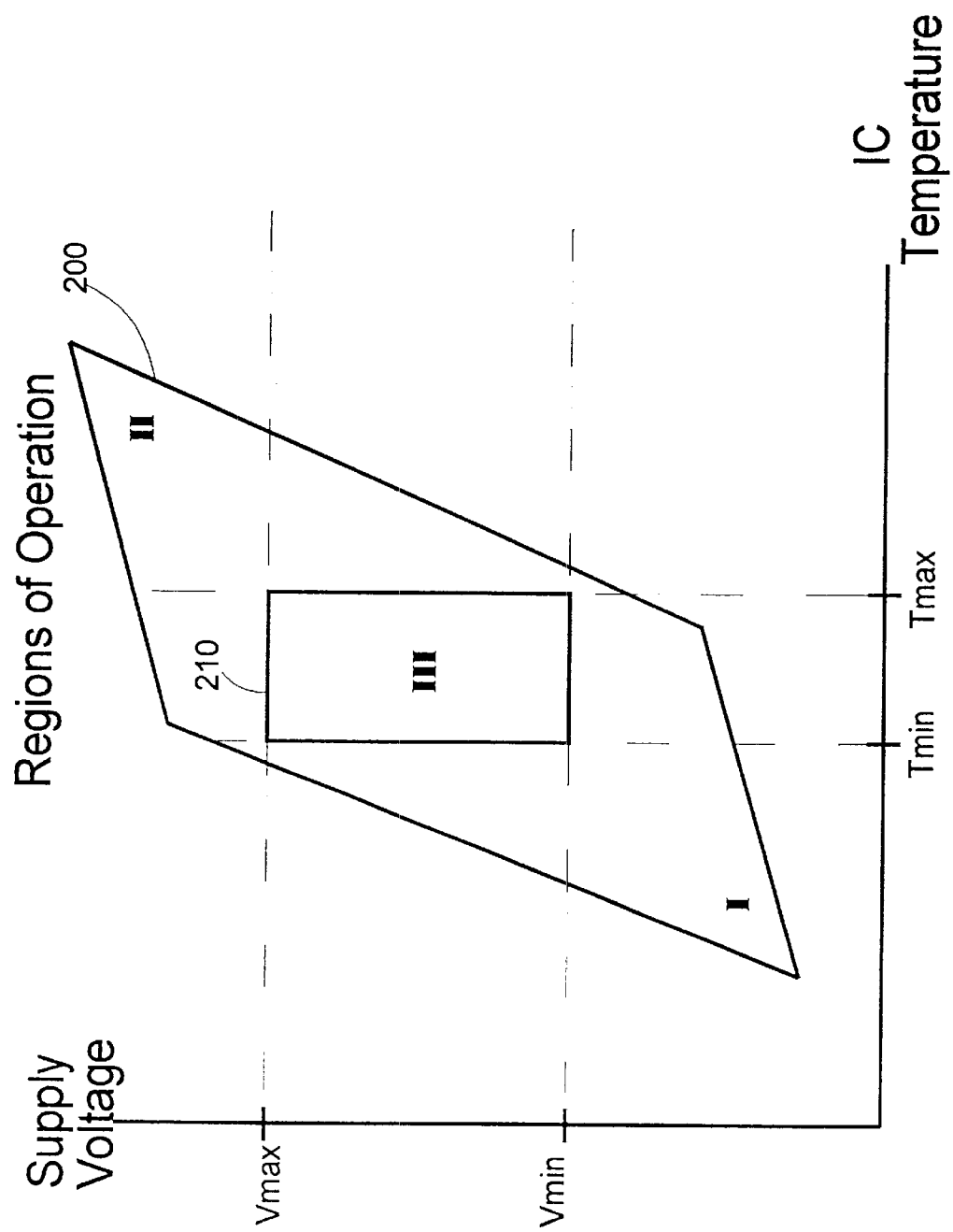
FIG. 1 is a graph illustrating the characterized and published operating regions of a typical integrated circuit with respect to voltage and temperature.

The invention relates to a novel method of controlling the power supply to an integrated circuit (IC) used in an electronic device, such as a microprocessor, a graphics display controller, a communications IC, or other high speed and power consuming ICs used in electronic devices. While particularly useful for these types of ICs, the apparatus and method disclosed within can be used with any IC in general and still meet the spirit and scope of the invention. One aspect of the invention is to monitor a parameter of the IC. The parameter is indicative of the effective channel mobility of the charge carriers within the IC. The effective channel mobility defines the channel conductance of the semiconductor components within the IC:

$$g \equiv \frac{Z}{L} \mu_{eff} |Q_n|$$

where g=channel conductance, Z=width of channel, L=length of channel, $\mu_{eff}$=effective channel mobility, and $Q_n$=charge per unit area (See Sze, S. M., *Physics of Semiconductor Devices*, John Wiley and Sons, 1969, pp. 512–515). This channel conductance along with the supply voltage to the IC determine the individual channel currents in devices within the IC. The individual channel current affects the rise and fall times of signals within the IC, the operating speed of the IC, and the power consumed by the IC. The individual channel currents are dependent on temperature. As the temperature increases, the effective channel mobility declines for MOSFET devices. The effective channel mobility is also dependent on the power supply voltage; that is, as the power supply voltage increases, the effective channel mobility also increases due to the increased velocity of the charge carriers. In addition, as the temperature increases, the gate threshold of individual transistors declines, thus tending to increase the individual channel current. The gate threshold of individual transistors declines as the power supply voltage increases. Thus, the individual channel current ($I_D$) as a function of temperature and supply voltage is approximately:

$$I_D = \frac{Z}{L} \mu_{eff}(T, V_{ds}) C_{ox} \frac{(V_{gs} - V_t(T, V_{ds}))^2}{2}$$

where $V_{ds}$=drain to source voltage and $V_{gs}$=gate to source voltage, i.e. both are typically set at the power supply voltage in a digital circuits when enabled. Therefore, to keep the individual channel current constant with temperature, the power supply voltage can be adjusted to compensate. Since each transistor on the IC has an individual channel current dependent on the width and length of the channel, it is desirable to monitor the effective channel mobility using some parameter of the IC which is indicative of the effective channel mobility. The monitored parameter is then used to adjust the power supply voltage delivered to the IC over a predetermined operating temperature range. By adjusting the power supply voltage to the IC, the effective channel mobility can be compensated to keep the individual channel currents at a substantially constant level or value over the predetermined operating temperature range for the IC. In keeping the individual channel currents constant, the rise and fall times of the outputs of the IC are also kept substantially constant thus maintaining comparable performance. Maintaining individual channel current levels at a substantially constant value over a selected predetermined temperature range allows for several possible benefits that can be achieved depending on the effective channel mobility level chosen.

FIG. 1 is an exemplary diagram showing a typical temperature operating region for an IC versus the supply voltage applied to the IC. The characterized region of operation 200 is that area where all of the parts testing during device characterization passed the functional electrical tests. The published region of operation 210, is a smaller region within the characterized region of operation 200, which the manufacturer of the IC guarantees operation of the IC. This published region of operation 210 is bounded by the published supply voltage operating $V_{min}$ and $V_{max}$ specifications, and by the published $T_{min}$ and $T_{max}$ specifications that limit the region of temperature operation. By selecting a region wherein the channel currents of the individual semiconductor devices on the IC are substantially minimized within the characterized operating parameters of the IC (region I in FIG. 1); the power consumed by the IC is minimized. When selecting a region wherein the channel currents of the individual semiconductor devices on the IC are substantially maximized within the characterized operating parameters of the IC (region II in FIG. 1); the operating speed of the IC is maximized. A further benefit that can be achieved is that by selecting a region such that the semiconductor devices on the IC's channel conductance is maintained within a level that is substantially within the middle of the characterized region of operation of the IC (region III in FIG. 1); the voltage and timing margins of the device are maintained consistently throughout the operating temperature range of the IC. Using this latter method allows use of ICs that have reduced timing margins thus increasing the yieldability of the ICs from the semiconductor wafer. Alternately, it also allows for extending the operating temperature region of the IC.

Figure 2:
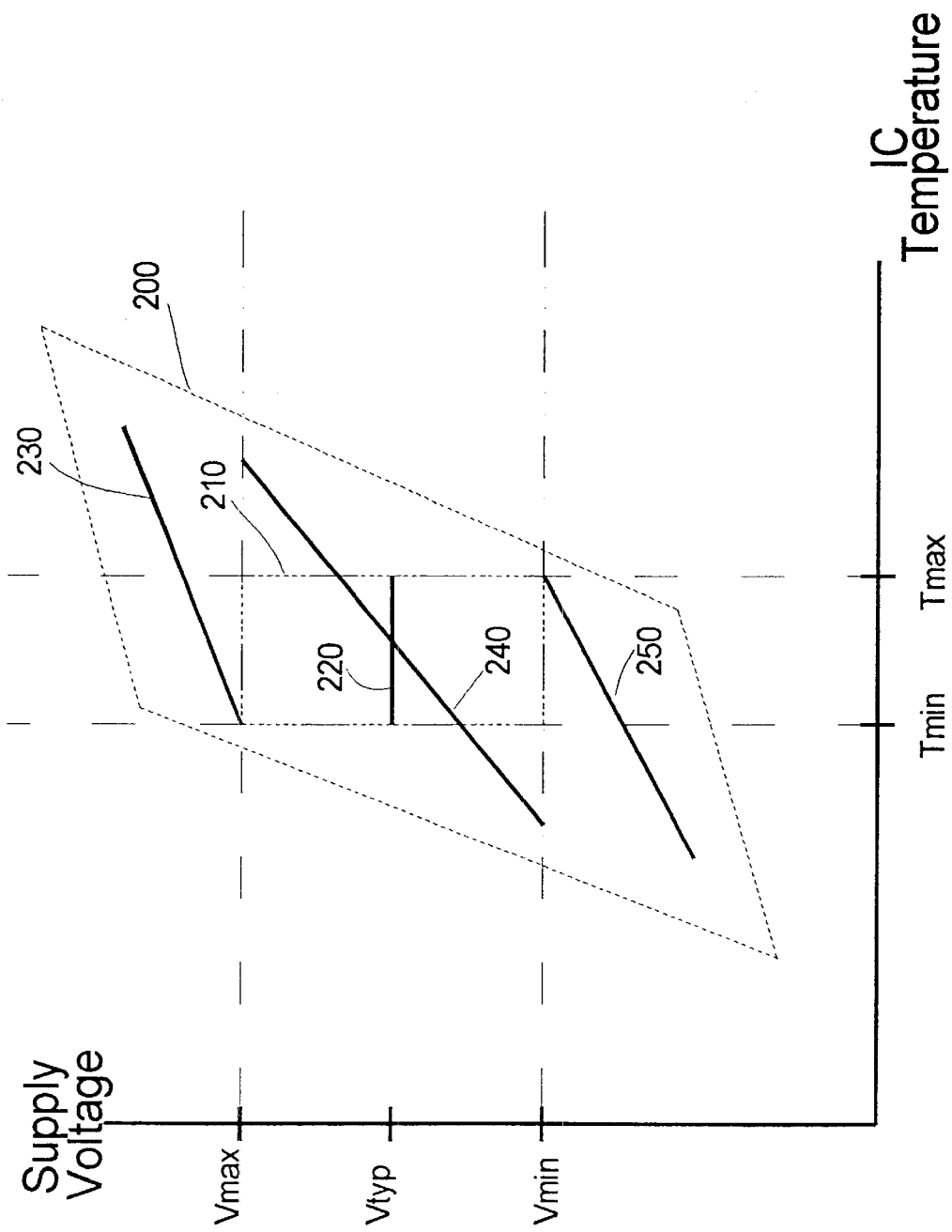
FIG. 2 is a graph illustrating possible voltage tracks within the characterized operating region for different benefits made possible by the invention.

FIG. 2 is a graph showing exemplary relationships (voltage tracks) of how the supply voltage to the IC is changed with respect to the IC temperature based on the desired benefit to be achieved by the invention. Also shown is a conventional voltage track 220 of a conventional power supply design for an IC. The characterized region of operation 200 and the published region of operation 210 are shown for reference. The conventional voltage track 220 illustrates that the supply voltage to the IC is kept constant at a $V_{typ}$ level over the operating temperature range of an IC in conventional systems. The exemplary performance voltage track 230 illustrates the supply voltage to operating temperature relationship for a system implementing one aspect of the invention to derive substantially maximum performance. Here the performance voltage track 230 is chosen to keep the individual channel currents of the IC constant at a predetermined level. In this exemplary embodiment, the IC is operated at its $V_{max}$ at $T_{min}$ and the supply voltage is increased as the temperature rises to keep the IC within its characterized region of operation 200 while keeping the individual channel currents constant. The exemplary voltage track 240 illustrates how the supply voltage to the IC can be regulated to either maximize the voltage and timing margins of the IC over temperature or to extend the operating temperature range of the IC without going outside of the characterized region of operation 200. This is done by operating the IC at $V_{min}$ at lower temperatures than specified and increasing the voltage of the IC up to $V_{max}$ with increasing temperature beyond that specified by the manufacturer of the IC such that the IC is still operated within the characterized region of operation. The exemplary low power voltage track 250 illustrates regulating the supply voltage to keep the power consumed by the IC substantially to a minimum while operating within the characterized region of operation 200. This is done by setting the voltage to the IC at $V_{in}$ at $T_{max}$ and lowering the voltage to the IC as the temperature drops. This action keeps the individual channels currents at substantially a fixed level, thus keeping the IC within the characterized region of operation. While each of the previously described exemplary voltage tracks illustrate operation of the IC outside of the published region of operation 210, a suitable voltage track can be chosen to only operate within the published region of operation to maximize a desired benefit while observing the IC manufacturers published specification and still meet the spirit and scope of the invention. What is preferred is that the voltage track be chosen such that the effective channel mobility of the IC is modified to keep the individual channel currents substantially constant over the predetermined operating temperature range selected for the IC in its intended application. However, a voltage track that is chosen to keep the IC within the characterized region of operation within a desired region can provide sub-optimized performance while still meeting the spirit and scope of the invention. Although the voltage tracks illustrated in FIG. 2 are shown as straight lines, the actual voltage track for a particular IC may be curvilinear due to the actual voltage to individual channel current relationship for a particular IC. Also, the actual voltage track can be approximated using piece-wise linear approximations of a curvilinear function and still keep the individual channel currents substantially constant over the predetermined operating temperature range.

Another aspect of the invention is to extend this concept to use with more than one IC used in an electronic device; a computer being a particular example. Because the core voltage of each IC using the invention would then operate a different supply voltage levels, a second bus supply voltage is provided to allow the IC's to communicate over a common bus. Those skilled in the art are aware that several voltage translation methods exist to provide the core voltage to bus voltage interface within the IC. In this approach, each IC that utilizes the invention can be optimized for a given purpose; i.e. reduced power consumption, maximized performance, or system integrity. It is also possible to link the adjustable core power supplies within the electronic device to enable the electronic devices to operate at either a minimum power for maximized battery life, maximized speed for maximized performance, or high reliability mode depending on a selection by the user from a configuration screen (see FIG. 7). The high reliability mode allows for the electronic device to operate outside of the IC manufacturer's specified range of operating temperature.

While one aspect of the invention is that the effective channel mobility control apparatus can exist external to the integrated circuit. Another aspect is that the effective channel mobility control apparatus be incorporated within the IC itself. This latter approach allows the IC manufacturer the ability to increase yields by allowing more ICs on a semiconductor wafer to operate over a wider temperature range. The former approach allows designers of electronic devices flexibility in determining the operation of the products to meet the end-user's needs. In addition to the invention, other conventional temperature control devices such as heat pipes, heat sinks, fans, and blowers to name a few, can be incorporated within the electronic device to further optimize an electronic device for a particular market or need.

Figure 3:
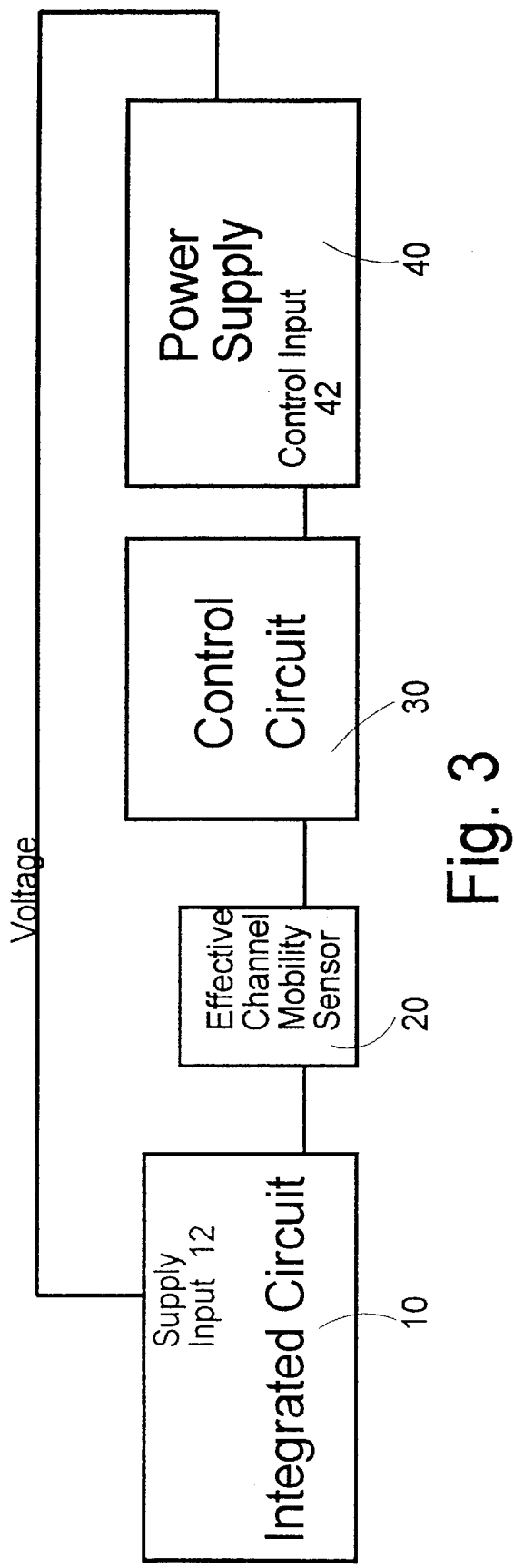
FIG. 3 is a block diagram illustrating one embodiment of the invention.

FIG. 3 is a block diagram of an exemplary embodiment of the invention. An integrated circuit (IC) 10 has a supply input 12 which accepts a voltage from a power supply 40. An effective channel mobility sensor (ECMS) 20 is used to measure a parameter of the IC 10 that is indicative of the effective channel mobility of the IC 10. The output of the ECMS 20 is coupled to a control circuit 30 which processes the output of ECMS 20 such that a resultant control signal is fed to a control input 42 of the power supply 40. The processing performed by the control circuit 30 keeps the individual channel currents of the IC 10 substantially constant over a predetermined operating temperature range by monitoring the effective channel mobility of IC 10 with EMCS 20 and adjusting the power supply 40 accordingly.

Figure 4:
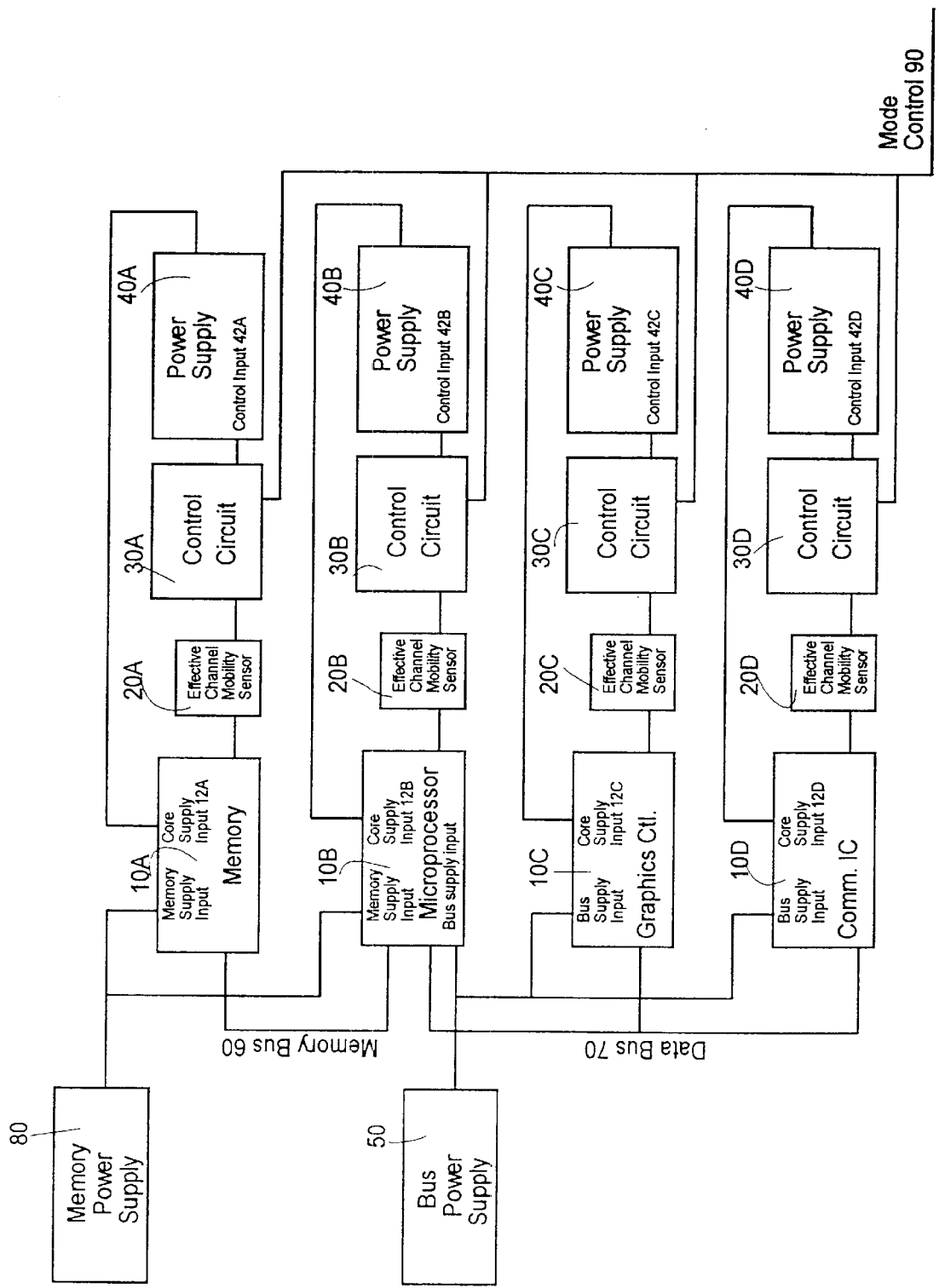
FIG. 4 is a block diagram illustrating an alternative embodiment of the invention.

FIG. 4 is a block diagram of another exemplary embodiment of the invention that has multiple ICs: a memory 10A, a microprocessor 10B, a graphics controller 10C, and a communications IC 10D. Each of these ICs, except memory 10A, are provided with a bus power supply voltage from bus power supply 50. In this exemplary embodiment, the memory 10A and microprocessor 10B share a common memory bus 60 and a memory power supply 80 that is used to operate the memory bus 60. A data bus 70 connects the microprocessor 10B, graphics controller 10C, and communications IC 10D. Each of the ICs, 10A–10D have a respective core supply input 12A–12D that is provided a supply voltage from a respective power supply 40A–40D. An ECMS 20A–20D is coupled to each respective IC 10A–10D to sense the respective effective channel mobility of the respective IC and provide an output to a respective control circuit 30A–30D. Each control circuit 30A–30D, manipulates the received respective EMCS 20A–20D signal and provides an output to the respective control input 42A–42D of the respective power supply 40A–40D. Each respective control circuit 30A–30D is designed to operate their respective IC 10A–10D at predetermined individual channel current levels to achieve one of the desired benefits of minimized power, maximized performance, extended temperature range, or increased reliability. Each IC 10A–10D can be separately optimized for one of the benefits or all of the ICs 10A–10D can be chosen to perform the same optimization of benefits depending on the system designer's choice. Alternatively, a user can provide input by way of a utility program (see FIG. 7) that then controls a mode control signal 90.

Figure 5:
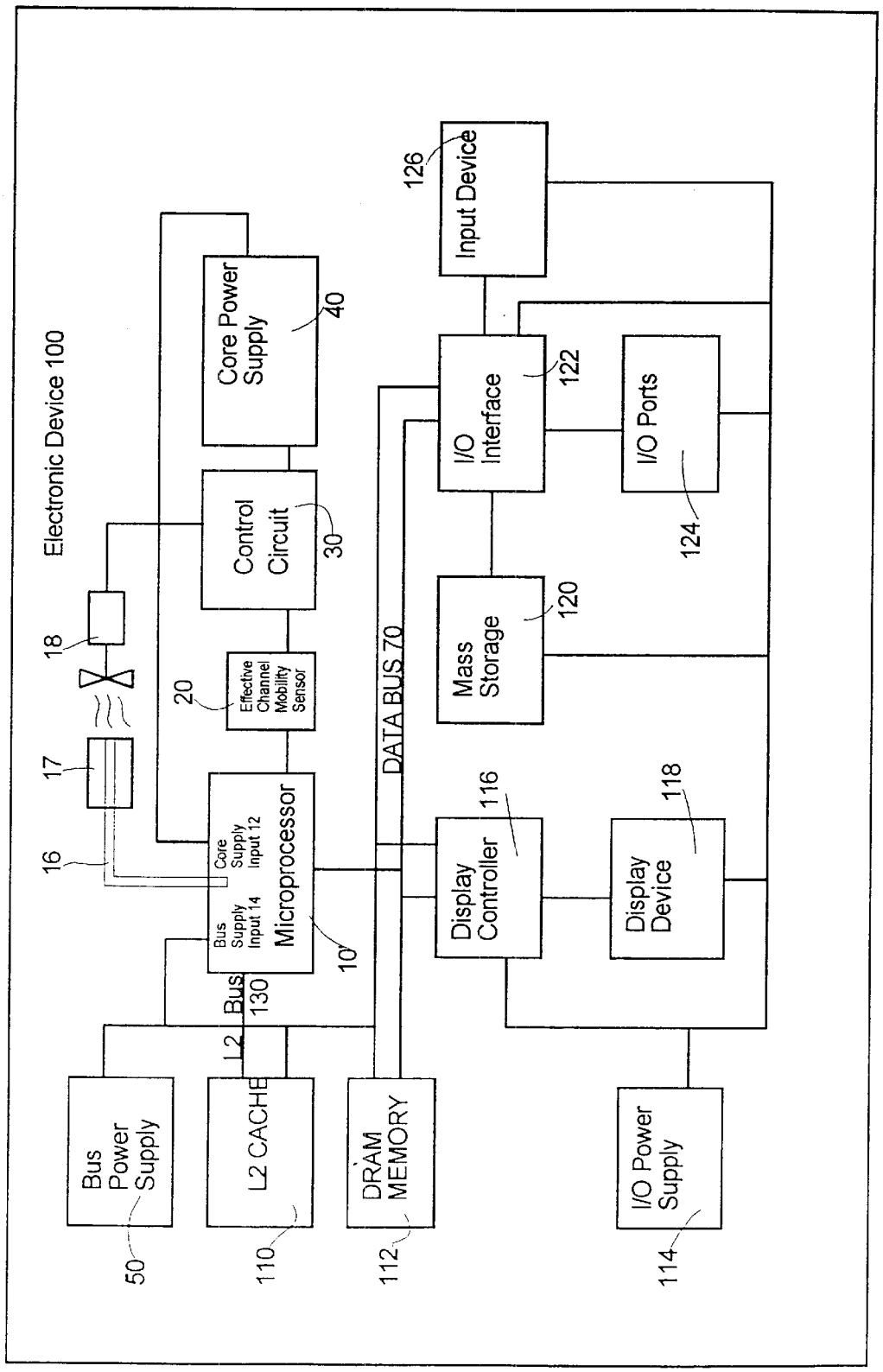
FIG. 5 is a block diagram of an electronic device incorporating an embodiment of the invention.

FIG. 5 is a block diagram of an exemplary electronic device 100 such as a personal computer, a notebook computer, a personal data assistant, a calculator, or personal information appliance, to name a few. A microprocessor 10' is connected by way of a data bus 70 to DRAM memory 112, a display controller 116, and an input/output (I/O) interface 122. The microprocessor 10' is also connected to L2 cache memory 110 by way of an L2 bus 130. A bus power supply 50 supplies power to the microprocessor 10', L2 cache 110, DRAM memory 112, display controller 116 and I/O interface 122. An I/O power supply 114 supplies power to display controller 116, a display device 118, mass storage 120, I/O ports 124, I/O interface 122 and input device 126. The I/O interface 122 allows the microprocessor 10' to access mass storage 120, I/O ports 124, and input device 126. The display controller 116 allows the microprocessor 10' to present graphical or alphanumeric data to the user using display device 118. The microprocessor 10' has a core supply input 12 which receives a voltage from core power supply 40. An effective channel mobility sensor (ECMS) 20 measures a parameter of the microprocessor 10' that is indicative of the channel mobility of microprocessor 10'. The output of the ECMS sensor 20 is then used by a control circuit 30 which adjusts the core power supply 40 to substantially maintain predetermined individual channel current levels of microprocessor 10' over a predetermined operating temperature range of the microprocessor 10'. The control circuit 30 is also able to control an air moving device 18, such as a fan or blower, or alternatively another cooling apparatus such as a multi-mode heat pipe. This air moving device 18 circulates air across a heat sink 17 which is thermally coupled to microprocessor 10' by way of a heat pipe 16. The air moving device 18, heat sink 17, and heat pipe 16 provide additional cooling of the microprocessor 10' in order to maintain thermal temperature of the microprocessor 10' if the elevated voltage to the microprocessor 10 causes the electronic device 100 to become too warm such as for safety to the user or to prevent too much heat to spread to other circuits in the system.

FIGS. 6A–6D illustrate several different methods of sensing and presenting the effective channel mobility of an IC. The effective channel mobility can be sensed by measuring the temperature (T) of the IC. The effective channel mobility typically has a $T^{-3/2}$ power dependence within an IC for a fixed voltage (See Sze, pp. 512–515).

Figures 6A, 6B, 6C, 6D:
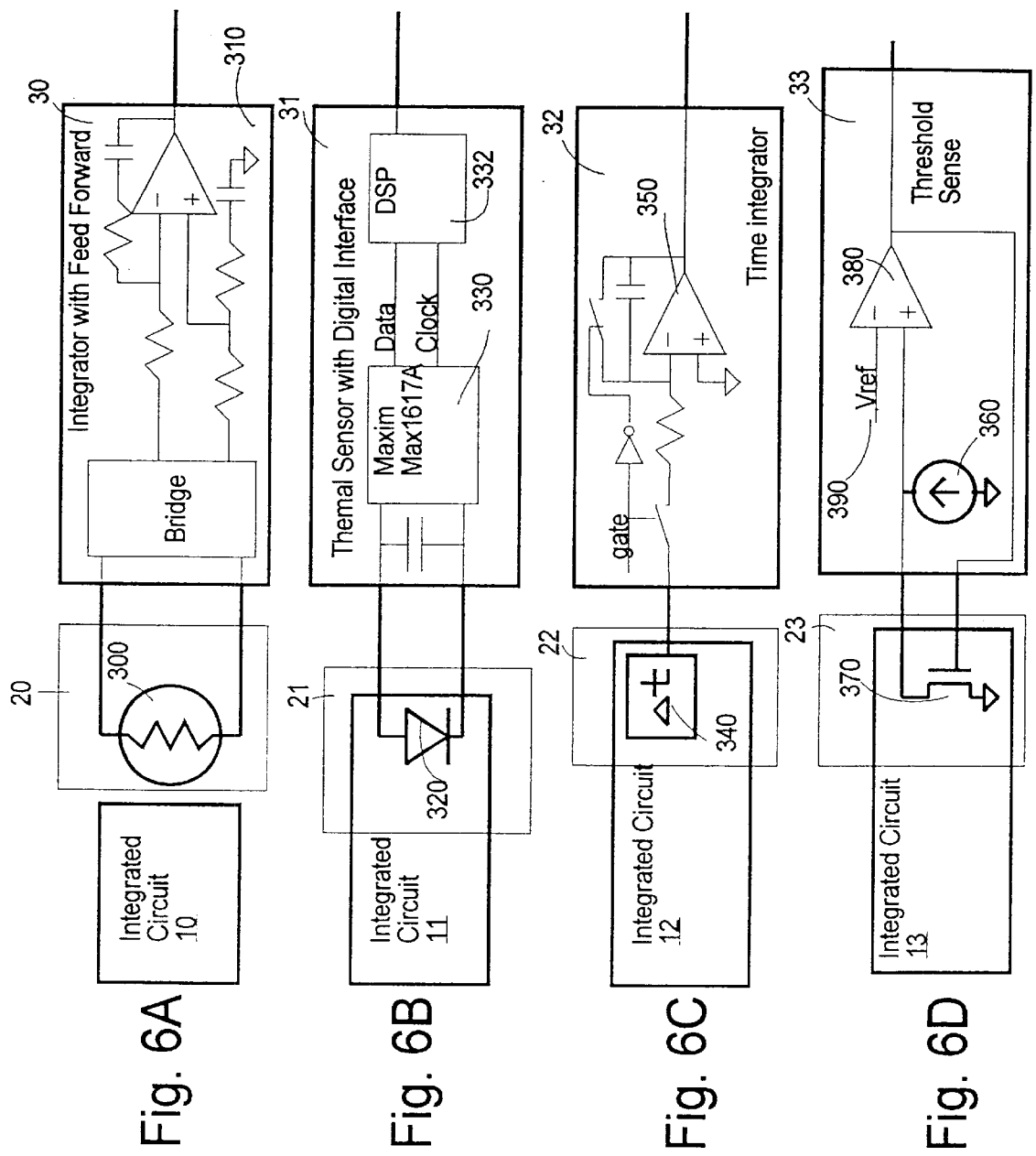
FIG. 6A illustrates an effective channel mobility sensor (ECMS) using a thermistor and a feed forward integrator circuit.
FIG. 6B illustrates a first alternative ECMS circuit using a diode and a thermal sensor with a digital output.
FIG. 6C illustrates a second alternative ECMS circuit which measures a time delay on an IC.
FIG. 6D illustrates a third alternative ECMS circuit which measures the gate threshold voltage of a field-effect transistor on the IC.

FIG. 6A illustrates an embodiment of an EMCS 20 for measuring the temperature of an integrated circuit 10 using a thermistor 300 and an integrator with a feed-forward circuit 310 in control circuit 30. Conventional thermistor temperature detection circuits typically exhibit a long time delay lag due thermal conductivity delays through the package of IC 10 and the time integration of the thermistor signal. This time delay is typically on the order of seconds. Since the IC 10 may be operating at a much higher speed than the rate at which the temperature can be sensed, the IC 10 may fail to operate properly before the control circuit 30 adjusting the supply voltage to the IC 10 can respond. In order to speed up the response time of the thermistor signal, the integrator with a feed-forward circuit 310 can be used within control circuit 30 to cancel the delay of the integrator. See commonly assigned U.S. patent application Ser. No. 08/955478, filed Oct. 22, 1997, for one technique that increases the response time of a thermistor using a feed forward circuit. However, even with the integrator delay cancelled, there is still a potential time delay due to thermal packaging of the IC 10 if an external thermistor 300 is used to detect the temperature of the IC 10. An alternative to an external sensor is to integrate the thermistor 300 within the IC 10 package to reduce the thermal delay from the IC 10 to the thermistor 300. Several different methods are known to those skilled in the art to create this thermistor integration within the IC 10 package.

FIG. 6B illustrates a first alternative embodiment for an ECMS 21 for measuring the temperature of an IC 11 using a internal diode 32, such as that found on some of Intel's Pentium II™ processors, and an analog to digital converter 330. The diode 320 or base-emitter junction of a transistor is embedded in the IC 11 on the silicon substrate to detect heat. The diode 320 junction's forward voltage drop is dependent on temperature. The diode's 320 forward voltage can be processed by way of analog processing similar to the thermistor, or it can be sampled by an analog to digital converter 330 within control circuit 31 and a digital output presented to the rest of control circuit 31. For an exemplary diode to digital signal converter which creates a digital readout see Maxim's 1671A specification. This digital output is then processed by a microcontroller, IC 11, or a digital signal processor 332 within the control circuit 31 to perform the necessary filtering and conversions to derive a signal that adjusts the core power supply to the IC 11.

FIG. 6C illustrates a second alternative embodiment for an EMCS 22 for detecting the effective channel mobility of an IC 12 using a time delay path 340 and a time integrator 350. Since the effective channel mobility controls the conductance of the semiconductor devices on the IC 12, a time delay path 340 within the IC 12 can be measured and this time delay path 340 is indicative of the effective channel mobility. Thus the length of the time delay path 340 can be measured by integrating the start to stop time of the delay with a time integrator 350 using a gate signal within control circuit 32. One advantage of this approach is that the time delay path 340 on the IC 12 can be chosen to be routed about the entire IC 12 surface area thus effectively averaging any thermal differences across the IC 12. The time delay path 340 can also be focused on a specific area of the IC 12 which may be thermally sensitive. The output of the time integrator 350 can be either analog or digital, depending on the type of control circuit 32 implemented.

FIG. 6D illustrates a third alternative embodiment for an ECMS 23 detecting the effective channel mobility of an IC 13. In this technique, the voltage threshold of a field effect transistor (FET) 370 is measured. The voltage threshold is linearly related to temperature (See Sze, p. 543). Therefore, this voltage threshold is indicative of channel conductivity within IC 13 and thus the effective channel mobility of IC 13. In this exemplary diagram, a constant current 360 within control circuit 33 is supplied to the drain of the FET 370 on the IC 13. A reference voltage 390 is applied to an operational amplifier 380 within control circuit 33 that adjusts the voltage on the gate of the FET 370 accordingly to keep the drain of the FET 3 70 at the reference voltage 390 level. The output of the operational amplifier 380 represents the FET's 370 gate threshold valve. This operational amplifier 380 output can be an analog signal or converted to a digital signal for processing in the control circuit 33 to control the supply voltage to IC 13.

While FIGS. 6A–6D illustrate some effective channel mobility sensors other methods for detecting the effective channel mobility on an IC, such as measuring the resistance of a diffusion resistor, are known to those skilled in the art and still meet the spirit and scope of the invention. Further, the ECMS and control circuit may be located external to the IC or integrated onto the IC itself and still meet the spirit and scope of the invention.

FIG. 7 illustrates an exemplary screen interface used by the user of an electronic device to select his desired efficient operating mode. The user can select to optimize performance, maximize battery life, extend the temperature operation, or use a default mode. The default mode is used to select an option where the power supply inputs to ICs controlled in the manner of the invention are kept at a constant voltage, thus effectively disabling the invention from operating. For example, in FIG. 4, the microprocessor 10B uses the user's selection to configure the mode control 90 signals to the control circuits 30A, 30B, 30C, and 30D. Having this feature allows the user of an electronic device to efficiently optimize his electronic device for a particular task and environment.

What is claimed is:

1. A method of determining a mode of operation of an electronic device having at least one integrated circuit (IC), a power supply coupled to that at least one IC, a display screen, and a predetermined operating temperature range, comprising the steps of:

displaying a choice of options on the display screen, the options selectable from at least one of maximizing performance, maximizing battery life, and extending the temperature operation for the electronic device;

receiving at least one of the options displayed on the display screen; and adjusting the power supply to the IC to modify and monitor the effective channel mobility of the IC such that individual channel current levels within the IC are substantially constant over the predetermined operating temperature range based on received options.

2. A method of determining a mode of operation of an electronic device, comprising the steps of:

displaying a choice of options on a display screen of the electronic device;

receiving an option for the operation of the electronic device chosen from one of maximizing performance, maximizing battery life, and extending the temperature operation; and adjusting a supply voltage to an IC within the electronic device to modify and monitor the effective channel mobility of the IC such that individual channel current levels within the IC are substantially constant over a predetermined operating temperature range based on received option.

* * * * *